United States Patent
O'Leary et al.

(10) Patent No.: US 6,974,401 B2
(45) Date of Patent: Dec. 13, 2005

(54) ACTIVE DAMPER FOR A PLANETARY GEAR ARRANGEMENT

(75) Inventors: Michael Francis O'Leary, Brighton, MI (US); David Allen Gilbert, Royal Oak, MI (US); Jeffrey S. Rayce, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/631,145

(22) Filed: Jul. 31, 2003

(65) Prior Publication Data

US 2005/0026743 A1   Feb. 3, 2005

(51) Int. Cl.$^7$ .......................... F16H 57/08; B60K 41/26

(52) U.S. Cl. ..................... 475/347; 475/331; 192/218

(58) Field of Search ................................. 475/331, 339, 475/346–47; 192/218; 464/109

(56) References Cited

U.S. PATENT DOCUMENTS

| | | | | |
|---|---|---|---|---|
| 5,766,109 A | * | 6/1998 | Sudau | 475/347 |
| 5,863,274 A | * | 1/1999 | Jackel | 475/347 |
| 6,398,655 B1 | * | 6/2002 | Orlamunder et al. | 464/68 |
| 6,477,909 B1 | | 11/2002 | Gilbert et al. | 74/333 |
| 6,652,409 B2 | * | 11/2003 | Kao et al. | 475/275 |
| 6,705,966 B2 | * | 3/2004 | Schröder et al. | 475/249 |

* cited by examiner

*Primary Examiner*—Roger Pang
(74) *Attorney, Agent, or Firm*—Laura C. Hargitt

(57) ABSTRACT

A planetary gear arrangement having at least three rotatable members with intermeshing gears and a primary torque path defined therein. At least one active friction damper is disposed between two of the planetary gear members, for example, a sun gear and a ring gear. The active damper is selectively operable to apply frictional engagement between the two members with which it is interconnected to establish a controlled secondary torque path therebetween. The active damper is effective to reduce gear lash changes between the gear members of a planetary assembly.

4 Claims, 3 Drawing Sheets

US 6,974,401 B2

ACTIVE DAMPER FOR A PLANETARY GEAR ARRANGEMENT

TECHNICAL FIELD

This invention relates to friction damping elements and, more particularly, to friction damping elements disposed within a planetary gear arrangement.

BACKGROUND OF THE INVENTION

Planetary systems have a plurality of meshing gear interfaces. Each of these gear meshes has a lash quantity built in for manufacturing purposes mostly. Therefore, during operation, the lash, which is the distance between the meshing gear teeth while they are in mesh, can reverse from being a driving tooth engagement to a driven tooth engagement. For example, the sun gear therein provides a driving arrangement to the planet pinions, which then provide a driving arrangement to the ring gear. However, should the torque or driving force at the sun gear be reversed and/or allowed to coast, the driving connection between the gear teeth will be reversed. That is, the ring gear will begin to drive the pinion gear and the pinion gear will drive the sun gear. Thus, the side of the tooth of each respective gear has reversed and has driving and driven capabilities.

It is known to put an active friction type damper between two shafts in a countershaft type transmission to reduce the gear rattle or lash change between the gear members on the input shaft, the output shaft, and the countershaft. In these arrangements, it is proposed to put the damper between the input shaft and the output shaft, which are coaxially aligned and supported one within the other. Such an arrangement is shown in U.S. Pat. No. 6,477,909 issued to Gilbert et al. on Nov. 12, 2002. This patent is assigned to the assignee of the present application.

SUMMARY OF THE INVENTION

It is an object of the present invention to provide an improved planetary gear arrangement having a friction damping interface between two members of the planetary gearset.

In one aspect of the present invention, an active damper mechanism is placed between the sun gear member of the planetary gearset and the ring gear member of the planetary gearset.

In another aspect of the present invention, a selectively active damper is placed between the ring gear member of a planetary gearset and the carrier member of a planetary gearset.

In yet another aspect of the present invention, an active damper is disposed within an all wheel drive transfer planetary gear arrangement.

In yet still another aspect of the present invention, the all wheel drive planetary gear arrangement has an input carrier member, a front output sun gear, a rear output sun gear, and pinion gears intermeshing with each other and with respective ones of the sun gears, and wherein an active damper mechanism is disposed between the input carrier and the front output sun gear.

In a yet still another aspect of the present invention, an active damper is disposed within the all wheel drive transfer planetary gear arrangement between the input carrier and the rear output sun gear.

In a further aspect of the present invention, active damper mechanisms can be positioned between the intermeshing planet pinion gears and/or between the output sun gear and one of the pinion gears meshing therewith.

DESCRIPTION OF EXEMPLARY EMBODIMENTS

Figure 1:
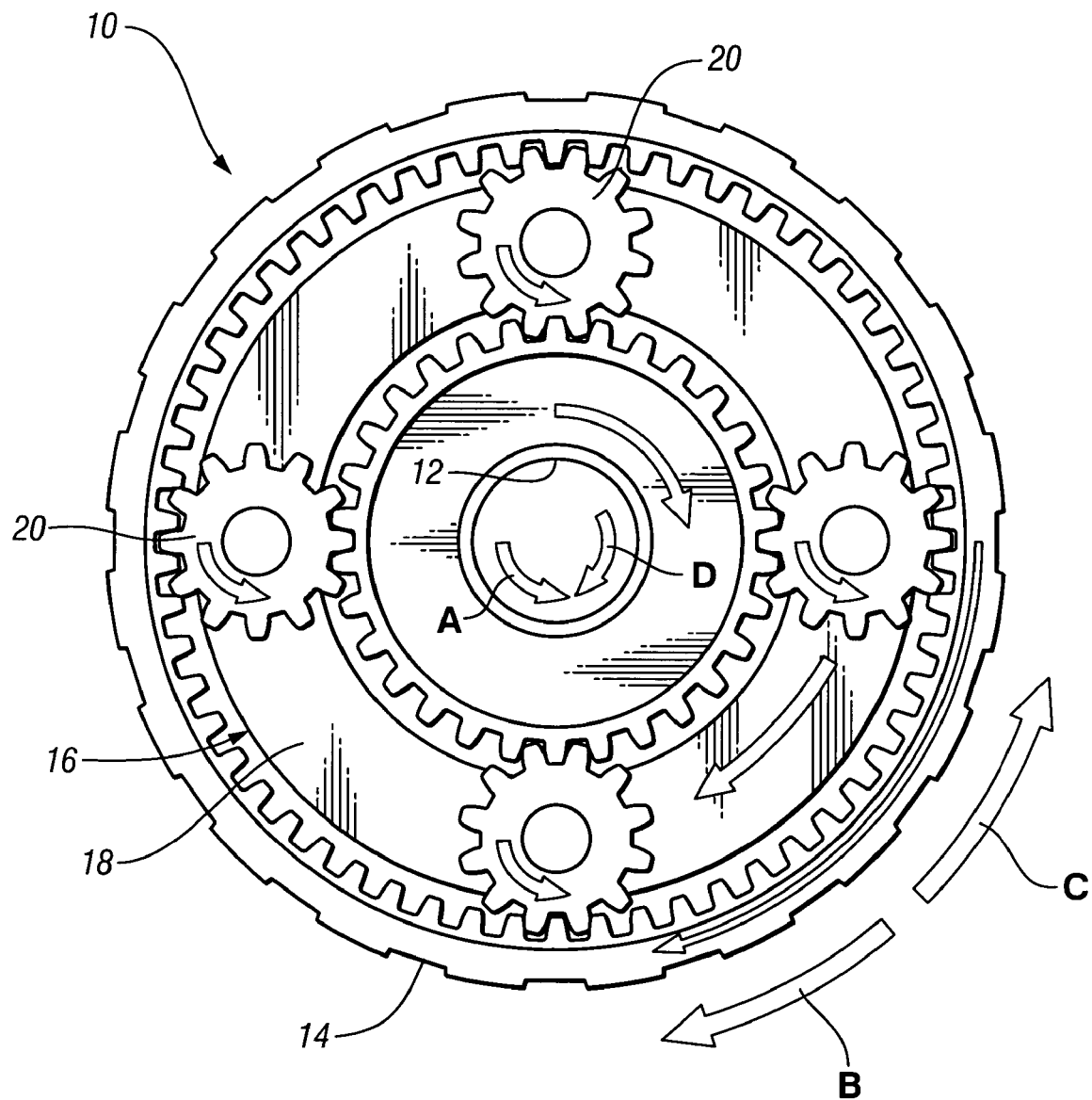
FIG. 1 is an elevational view of a planetary gearset incorporating the present invention.

Referring to the drawings, wherein like characters represent the same or corresponding parts throughout the several views, there is seen in FIG. 1 a planetary gear arrangement 10 including a sun gear member 12, a ring gear member 14, and a planet carrier assembly member 16. The planet carrier assembly member 16 includes a planet carrier member 18 having rotatably mounted thereon a plurality of pinion gears 20, which are disposed in meshing relationship with both the sun gear member 12 and the ring gear member 14.

As is well known, when the sun gear member 12 rotates in the direction of Arrow A, the ring gear member 14 will rotate in the direction of Arrow B. Also, when the ring gear member 14 rotates in the direction of Arrow C, the sun gear member 12 will rotate in the direction of Arrow D. During normal transmission operation, the sun gear member 12 will be rotating in the direction of Arrow A to drive the ring gear member 14 in the direction of Arrow B. At sometime during the operation, the planetary gear arrangement 10 may change from a driving planetary gearset to a coasting planetary gearset in which case the ring gear member 14 may rotate in the direction of Arrow C and thereby driving the sun gear member 12 in the direction of Arrow D.

During this interchange of rotational torque transmission, the intermeshing gear teeth between the sun gear member 12 and the pinion gears 20 and also between the ring gear member 14 and the pinion gears 20 will be transferred from one side of the teeth to the other. Since the teeth of meshing gears cannot be continuously in contact with both sides, some lash is built into the system to permit the reversal of torque through the planetary gearset. However, the lash condition can produce a noise relationship, which is not desirable.

Figure 2:
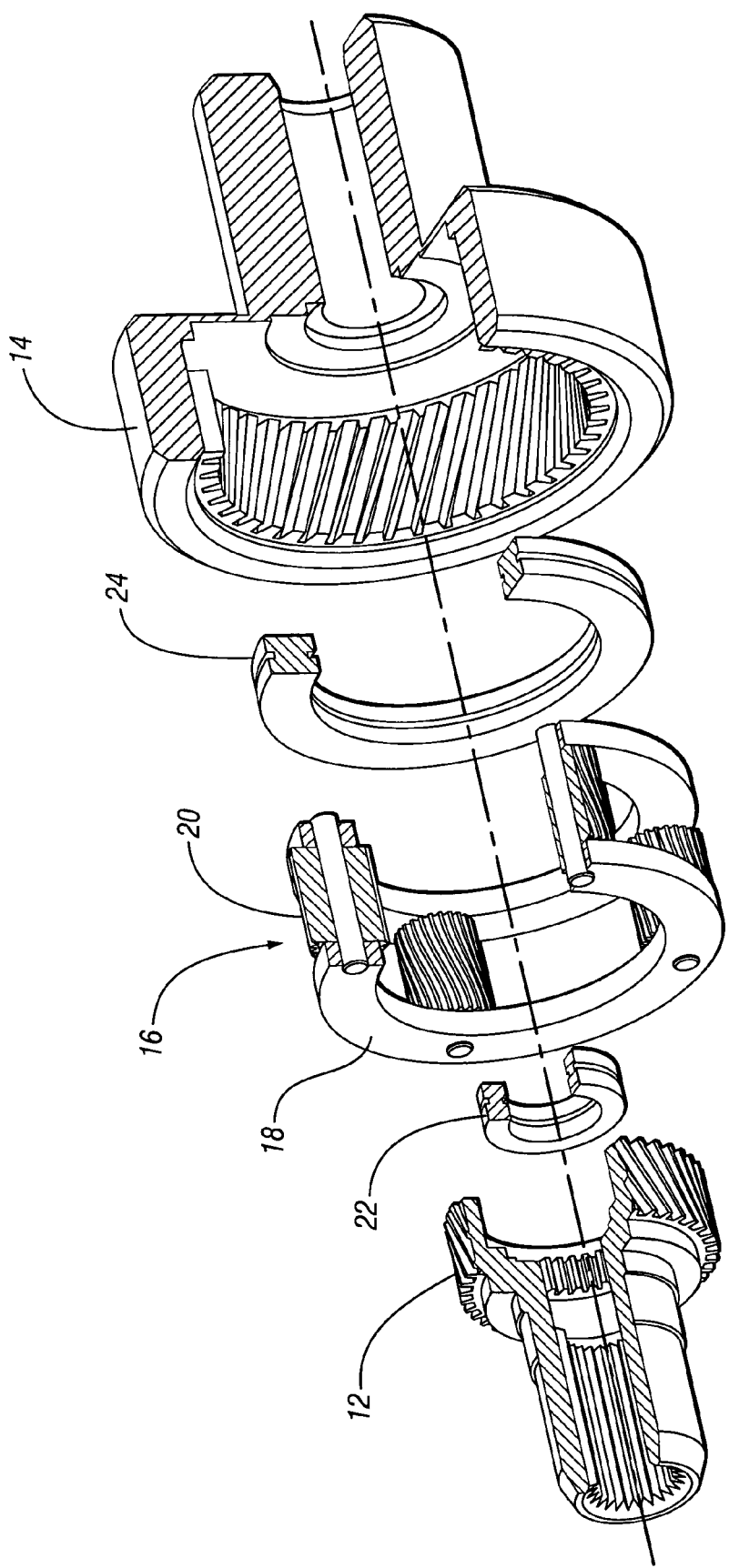
FIG. 2 is an exploded view of the planetary gearset shown in FIG. 1 depicting an active damper mechanism between various members of the planetary gearset.

To accommodate this situation in the present invention, an active friction damper 22 is disposed, as seen in FIG. 2, to engage the sun gear member 12 and the ring gear member 14. When the torque reversal or drive reversal occurs within the planetary gear arrangement 10, the friction damper 22 is activated such that the ring gear member 14 and sun gear member 12 have a slipping frictional component generated therebetween, which reduces the speed or the velocity at which the lash condition changes from a sun gear drive condition to a ring gear drive condition thereby reducing the noise which might otherwise occur.

Also shown in FIG. 2 is an active friction damper 24, which is disposed between the ring gear member 14 and the planet carrier member 18. The damper in this position can also be activated during a torque reversal within the system to eliminate the gear interface noise that might be generated during such torque reversal. It is possible in assemblies to use one of the friction dampers either 22 or 24, or to incorporate both of the friction dampers 22 and 24. Preferably, the friction dampers are controlled by a conventional electronic control unit (ECU), not shown, which is sensitive to the operating condition of the transmission and also the operating condition of the engine.

During certain operating conditions, the ECU will issue electronic signals to the damper 22 and/or the damper 24 to cause energization of the dampers just during the time period that a noise is most likely to occur. These conditions might occur with engine throttle position change, gear ratio change within the transmission, or a number of other conditions. Each of these conditions is known to the ECU, which generally includes a conventional programmable digital computer to provide the speed necessary for the actuation of the devices within the transmission. The construction and operation of these mechanisms, such as the ECU, is well known within the art of transmission design and construction.

The active dampers 22 and 24 are operable to apply a frictional drag torque between the two components that they contact. The level or amount of drag torque applied is not capable of rendering the two components to rotate in unison, it merely retards any rapid relative rotational changes between the two, which eliminates the lash noise that might otherwise occur.

Figure 3:
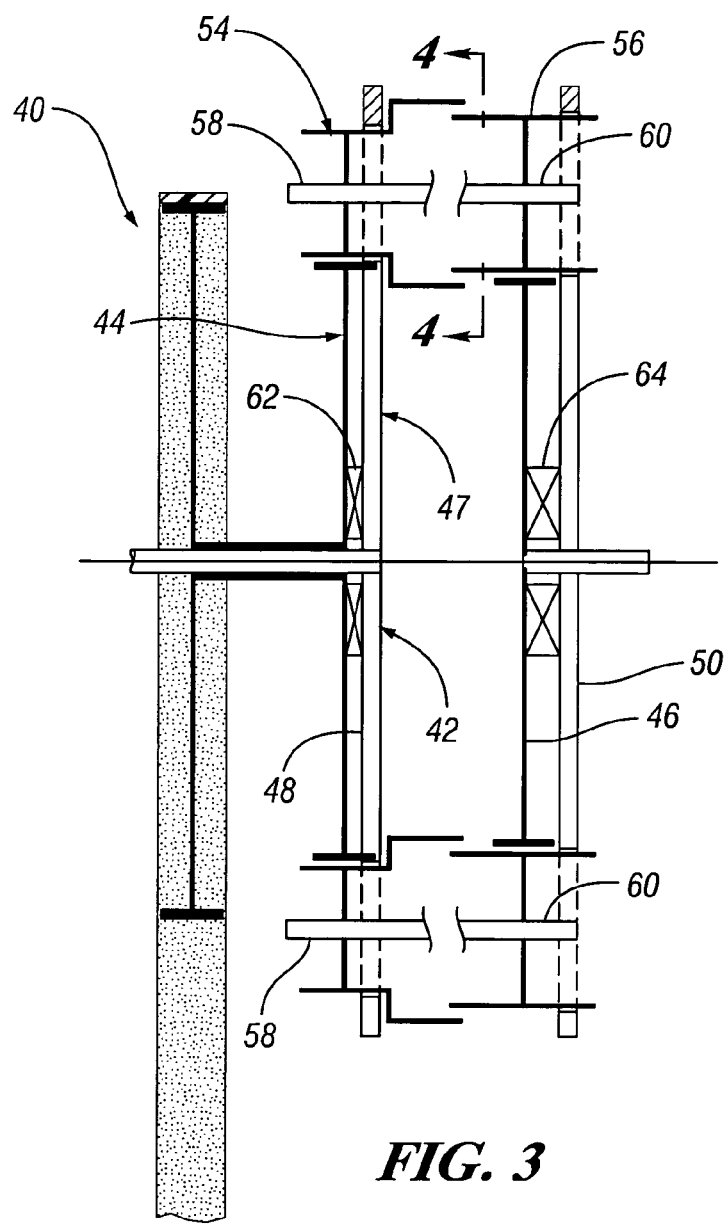
FIG. 3 is a schematic representation of a planetary gearset used in an all wheel drive transfer planetary gear arrangement and incorporating the present invention.
Figure 4:
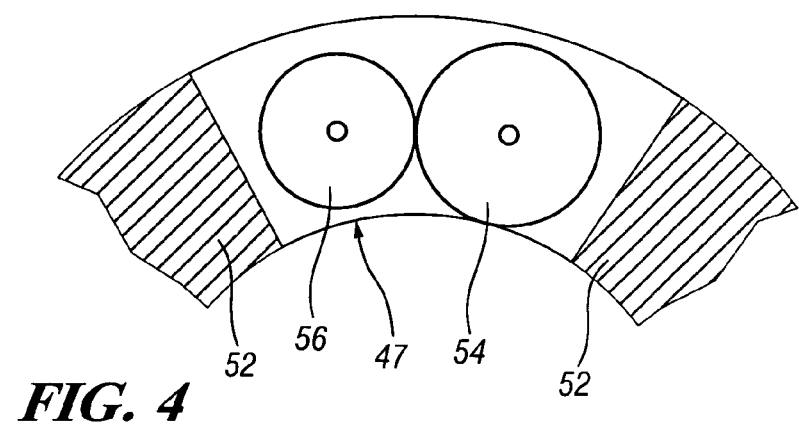
FIG. 4 is a view taken along line 4—4 of FIG. 3.

FIGS. 3 and 4 depict schematically and diagrammatically a planetary differential generally designated 40. The planetary differential 40 includes an input planet carrier assembly member 42, a first output sun gear 44, and a second output sun gear 46. The planet carrier assembly member 42 includes a planet carrier assembly member 47 having side plates 48 and 50 that are interconnected through extensions 52. A pair of meshing pinion gears 54 and 56 is rotatably supported on pins 58 and 60, respectively. The pins 58 and 60 are secured to the side plates 48 and 50. The pinion gears 54 and 56 mesh with the sun gears 44 and 46, respectively.

The side plate member 48 can be operatively connected with the sun gear member 44 through an active damper 62 and the side plate member 50 can be operatively connected with the sun gear member 46 through an active damper 64. The active damper 62 is effective to control rapid speed changes between the sun gear 44 and the planet carrier assembly member 47, which will, of course, reduce gear lash noise between the pinion gears 54 and the sun gear 44.

The active damper 64 is effective when operated to reduce rapid velocity changes between the side plate 50 and the sun gear 46 thereby reducing the gear lash noises between the sun gear 46 and the pinion gear 56. It is also possible to position active dampers between the pinion gears 54 and 56 and the planet carrier side plates 48 and 50. Activation of these friction dampers will reduce or eliminate lash noise between the meshing pinion gears 54 and 56.

In view of the above description, it will now be evident to those skilled in the art that the active dampers may be placed either singularly or in combination between various members of the planetary gear arrangement to accommodate the reduction in lash noise which can occur during various operating conditions such as throttle changes of the engine or ratio changes at the transmission.

What is claimed is:

1. A planetary gear arrangement comprising:

three rotatable members, a first of which is a planet carrier assembly member having at least a planet carrier member and a plurality of pinion gear members rotatably mounted on said planet carrier member, a second of said rotatable members being disposed in meshing engagement with at least one of said pinion gear members, a third of said rotatable members being disposed in meshing engagement with at least one of said pinion gear members;

a selectively engageable active friction damper means comprised of a normally disengaged torque transmitting mechanism disposed between and adapted to selectively apply a frictional engagement between at least two of said rotatable members within an individual planetary gear arrangement during a torque reversal through said planetary gear arrangement;

means for selectively activating said active friction damper for engagment in anticipation of a lash change between said rotatable members to minimize lash within said individual planetary gear arrangement prior to a torque reversal associated with a gear change event or other transient driveline disturbance to provide frictional damping and minimize noise.

2. The planetary gear arrangement defined in claim 1 further wherein:

said two members engaged by said active damper means are a sun gear member and a ring gear member.

3. The planetary gear arrangement defined in claim 1 further wherein:

said two members engaged by said active damper means are a ring gear member and said planet carrier member.

4. The planetary gear arrangement defined in claim 1 further wherein:

said two members engaged by said active damper means are a sun gear member and said planet carrier member.

* * * * *